US008319827B2

(12) United States Patent
Lee

(10) Patent No.: US 8,319,827 B2
(45) Date of Patent: Nov. 27, 2012

(54) APPARATUS FOR PROCESSING IMAGE SIGNAL AND METHOD FOR CONTROLLING THEREOF

(75) Inventor: Eun-bae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1268 days.

(21) Appl. No.: 11/751,688

(22) Filed: May 22, 2007

(65) Prior Publication Data

US 2008/0151043 A1   Jun. 26, 2008

(30) Foreign Application Priority Data

Dec. 26, 2006  (KR) .......................... 10-2006-0133363

(51) Int. Cl.
*H04N 13/04* (2006.01)
(52) U.S. Cl. ................ 348/51; 348/43; 348/55
(58) Field of Classification Search .............. 348/43–60, 348/E13.062, E13.063, E13.064, E13.068
See application file for complete search history.

(56) References Cited

U.S. PATENT DOCUMENTS

| | | | | |
|---|---|---|---|---|
| 6,774,952 | B1 * | 8/2004 | Ratcliffe | 348/581 |
| 7,228,009 | B2 * | 6/2007 | Kim et al. | 382/300 |
| 7,746,931 | B2 * | 6/2010 | Kato et al. | 375/240.16 |
| 8,077,117 | B2 * | 12/2011 | Kim et al. | 345/7 |
| 2003/0048354 | A1 * | 3/2003 | Takemoto et al. | 348/51 |
| 2004/0008893 | A1 * | 1/2004 | Itoi et al. | 382/236 |
| 2007/0236493 | A1 * | 10/2007 | Horiuchi et al. | 345/419 |
| 2008/0151043 | A1 * | 6/2008 | Lee | 348/51 |
| 2008/0152241 | A1 * | 6/2008 | Itoi et al. | 382/234 |
| 2009/0179920 | A1 * | 7/2009 | Riemens et al. | 345/660 |
| 2010/0053305 | A1 * | 3/2010 | Guillou et al. | 348/43 |
| 2010/0171814 | A1 * | 7/2010 | Routhier et al. | 348/46 |

* cited by examiner

*Primary Examiner* — LaShonda Jacobs
(74) *Attorney, Agent, or Firm* — Sughrue Mion, PLLC

(57) ABSTRACT

An image signal process apparatus and a method for controlling thereof are provided. The image signal process apparatus includes a storage unit storing pixel data of an incoming frame image, a scaling filter generating one frame image by scaling the pixel data, and a controller retrieving a part of the pixel data among pixel data of the frame image stored at the storage unit, and transmitting the retrieved pixel data to the scaling filter. As a result, a process of processing a stereoscopic image may be reduced such that deterioration of an image quality may be prevented, and a data processing time may be reduced.

16 Claims, 7 Drawing Sheets

| L1,1 | L1,2 | L1,3 | ... | L1,n/2 | R1,1 | R1,2 | R1,3 | ... | R1,n/2 |
|---|---|---|---|---|---|---|---|---|---|
| L2,1 | L2,2 | L2,3 | ... | L2,n/2 | R2,1 | R2,2 | R2,3 | ... | R2,n/2 |
| L3,1 | L3,2 | L3,3 | ... | L3,n/2 | R3,1 | R3,2 | R3,3 | ... | R3,n/2 |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| Lm,1 | Lm,2 | Lm,3 | ... | Lm,n/2 | Rm,1 | Rm,2 | Rm,3 | ... | Rm,n/2 |

FIG. 3C

| ADDRESS | PIXEL DATA | RETRIEVING ORDER | |
|---|---|---|---|
| 1 | L1,1 | 1 | |
| 2 | L1,2 | 2 | PIXEL DATA GROUP1 |
| ... | ... | ... | |
| n/2 | L1,n/2 | n/2 | |
| n/2+1 | R1,1 | mxn/2+1 | |
| ... | ... | ... | PIXEL DATA GROUP2 |
| n | R1,n/2 | ... | |
| n+1 | L2,1 | n/2+1 | PIXEL DATA GROUP3 |
| n+2 | L2,2 | n/2+2 | |
| ... | ... | ... | |
| ... | ... | ... | |
| ... | ... | ... | |
| (m−1)xn+1 | Lm,1 | ... | |
| (m−1)xn+2 | Lm,2 | ... | PIXEL DATA GROUP 2m−1 |
| ... | ... | ... | |
| (m−1)xn+n/2 | Lm,n/2 | mxn/2 | |
| ... | ... | ... | |
| ... | ... | ... | |
| mxn−1 | Rm,n/2−1 | mxn−1 | PIXEL DATA GROUP 2m |
| mxn | Rm,n/2 | mxn | |

| L1,1 | L1,2 | L1,3 | ... | ... | ... | ... | ... | ... | L1,n |
|---|---|---|---|---|---|---|---|---|---|
| L2,1 | L2,2 | L2,3 | ... | ... | ... | ... | ... | ... | L2,n |
| L3,1 | L3,2 | L3,3 | ... | ... | ... | ... | ... | ... | L3,n |
| ... | ... | ... | ... | ... | ... | ... | ... | ... | ... |
| Lm/2,1 | Lm/2,2 | Lm/2,3 | ... | ... | ... | ... | ... | ... | Lm/2,n |
| R1,1 | R1,2 | R1,3 | ... | ... | ... | ... | ... | ... | R1,n |
| R2,1 | R2,2 | R2,3 | ... | ... | ... | ... | ... | ... | R2,n |
| R3,1 | R3,2 | R3,3 | ... | ... | ... | ... | ... | ... | R3,n |
| ... | ... | ... | ... | ... | ... | ... | ... | ... | ... |
| Rm/2,1 | Rm/2,2 | Rm/2,3 | ... | ... | ... | ... | ... | ... | Rm/2,n |

FIG. 4C

| ADDRESS | PIXEL DATA | RETRIEVING ORDER | |
|---|---|---|---|
| 1 | L1,1 | 1 | |
| 2 | L1,2 | 2 | |
| ... | ... | ... | |
| n | L1,n | n | |
| n+1 | L2,1 | n+1 | |
| n+2 | L2,2 | n+2 | PIXEL DATA GROUP1 |
| ... | ... | ... | |
| 2xn | L2,n | 2xn | |
| ... | ... | ... | |
| ... | ... | ... | |
| (mxn)/2-1 | Lm/2,n-1 | (mxn)/2-1 | |
| mxn/2 | Lm/2,n | (mxn)/2 | |
| (mxn)/2+1 | R(m/2+1),1 | (mxn)/2+1 | |
| ... | R(m/2+1),2 | ... | |
| ... | ... | ... | |
| ... | ... | ... | PIXEL DATA GROUP2 |
| ... | ... | ... | |
| ... | ... | ... | |
| mxn-1 | Rm/2,n-1 | ... | |
| mxn | Rm/2,n | mxn | |

APPARATUS FOR PROCESSING IMAGE SIGNAL AND METHOD FOR CONTROLLING THEREOF

CROSS-REFERENCE TO RELATED APPLICATIONS

This application claims priority from Korean Patent Application No. 10-2006-0133363 filed on Dec. 26, 2006 in the Korean Intellectual Property Office, the entire disclosure of which is incorporated herein by reference.

BACKGROUND OF THE INVENTION

1. Field of the Invention

Apparatuses and methods consistent with the present invention relate to a scaler and a method for controlling thereof, and more particularly, a scaler and a method for controlling a scaler to process a stereoscopic image.

2. Description of the Related Art

A stereoscopic image refers to an image of an object showing the object with depth. Stereoscopic images are generated by means of a stereography camera which uses a binocular lens for capturing images. The same object is photographed through the binocular lens and the two images of the object are combined into one frame and the frame is stored. A frame image photographed through a right lens of the binocular lens is a right frame image, and a frame image photographed through a left lens of the binocular lens is a left frame image. That is, the stereoscopic image is a synthesis of the right frame image with the left frame image.

As described above, to display the stereoscopic image, which is a combination of the right frame image with the left frame image, a separate formatter for dividing the right frame image and the left frame image is needed. Therefore, a user is required to buy not only a display apparatus but also the formatter to display the stereoscopic image. Also, data loss occurs when the formatter processes data such that the stereoscopic image has lower definition than a plane image.

SUMMARY OF THE INVENTION

The present invention has been provided to address the above-mentioned and other problems and disadvantages occurring in the conventional arrangement, and an aspect of the present invention provides a scaler alternatively retrieving pixel data according to whether the inputted image is a plane image or a stereoscopic image, and a method for controlling thereof.

According to an aspect of the present invention, an image signal process apparatus may comprise a storage unit which stores pixel data of an incoming frame image; a scaling filter which generates one frame image by scaling the pixel data; and a controller which retrieves a part of the pixel data among pixel data of the frame image stored at the storage unit, and transmitting the retrieved pixel data to the scaling filter.

The controller retrieves the remaining pixel data among pixel data of the frame image stored at the storage unit, and the scaling filter may further generate another frame image by scaling the remaining pixel data.

The incoming frame image may be a stereoscopic image which comprises a left frame image and a right frame image.

The part of the pixel data retrieved by the controller may constitute one of the left frame image and the right frame image.

The controller may retrieve the pixel data of the right frame image, after retrieving the pixel data of the left frame image and transmitting the retrieved pixel data to the scaling unit.

The controller groups the pixel data stored at the storage unit, and retrieves the grouped pixel data in an alternate order.

According to an aspect of the present invention, a method for controlling an image signal process apparatus may comprise a process of storing pixel data of an incoming frame image; a process of retrieving a part of the pixel data among pixel data of the frame image stored at the storage unit; and a process of generating one frame image by scaling the pixel data.

The retrieving retrieves the remaining pixel data among pixel data of the frame image stored at the storage unit, and the process of generating the frame generates another frame image by scaling the remaining pixel data.

The incoming frame image may be a stereoscopic image which comprises a left frame image and a right frame image.

The part of the pixel data retrieved by the controller may constitute one of the left frame image and the right frame image.

The retrieving may retrieve the pixel data of the right frame image, after retrieving the pixel data of the left frame image and transmitting the retrieved pixel data to the scaling unit.

The retrieving may group the pixel data, and may retrieve the grouped pixel data in an alternate order.

BRIEF DESCRIPTION OF THE DRAWINGS

These and/or other aspects and advantages of the invention will become apparent and more readily appreciated from the following description of exemplary embodiments, taken in conjunction with the accompanying drawing figures of which:

FIG. 3A through 3C are drawings to explain methods for storing and retrieving the pixel data of the stereoscopic image according to an exemplary embodiment of the present invention.

FIG. 4A through 4C are drawings to explain methods for storing and retrieving the pixel data of the stereoscopic image according to another exemplary embodiment of the present invention.

DETAILED DESCRIPTION OF EXEMPLARY EMBODIMENTS

Certain exemplary embodiments of the present invention will now be described in greater detail with reference to the accompanying drawings.

Figure 1:
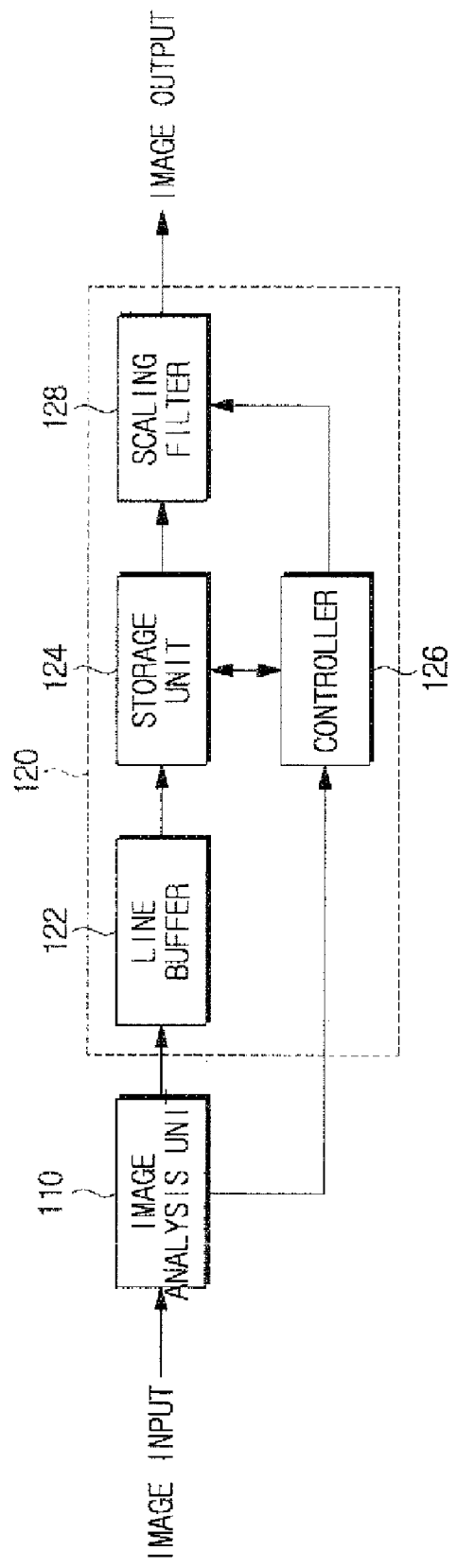
FIG. 1 is a block diagram of an image signal process apparatus according to an exemplary embodiment of the present invention.

FIG. 1 is a block diagram of an image signal process apparatus according to an exemplary embodiment of the present invention. Referring to FIG. 1, the image signal process apparatus comprises an image analysis unit 110, and a scaler 120.

The image analysis unit 110 analyzes a dimension of an inputted image. More particularly, the image analysis unit 110 analyzes whether the inputted image is a plane image or a stereoscopic image, and transmits the analyzed result to a controller 126. The image analysis unit 110 transmits the inputted image to a line buffer 120. To determine a dimension of the inputted image, the image analysis unit 110 determines whether or not the inputted image is a combination of two frame images. If the inputted image is a combination of two frame images, the image analysis unit 110 determines the inputted image as a stereoscopic image, and if the inputted image is comprised of only one frame image, the image analysis unit 110 determines the inputted image as a plane image.

The scaler 120 converts a resolution of the inputted image to coincide with a resolution of the image signal process apparatus. That is, the scaler 120 comprises a line buffer 122, a storage unit 124, a controller 126, and a scaling filter 128, to enlarge or reduce a size of the inputted image, so that a size of the inputted image is suitable for a size of a screen on which the inputted image is to be displayed.

The line buffer 122 stores pixel data of the inputted image in a line unit, and transmits the stored pixel data in the line unit to the storage unit 124.

The storage unit 124 stores pixel data of the line unit inputted from the line buffer 122 in a frame unit.

The controller 126 controls the overall operation of the scaler 120. That is, the controller 126 retrieves the pixel data stored at the storage unit 124 on the basis of dimensional formation of the inputted image transmitted from the image analysis unit 110, and transmits the retrieved pixel data to the scaling filter 128.

If information is transmitted, indicating that the image inputted from the image analysis unit 110 is a stereoscopic image, the controller 126 retrieves a part of pixel data among the pixel data of the inputted frame image stored at the storage unit 124, and transmits the retrieved pixel data to the scaling filter 128, and then retrieves the remaining pixel data of the frame, and transmits the retrieved pixel data to the scaling filter 128.

If information is transmitted, indicating that the image inputted from the image analysis unit 110 is a plane image, the controller 126 retrieves entire pixel data of frame image stored at the storage unit 124, and transmits the retrieved data to the scaling filter 128.

The scaling filter 128 scales the pixel data of the inputted image transmitted from the controller 126 so that the image size of the inputted image is suitable for the size of a screen on which the inputted image is to be displayed.

Figure 2:
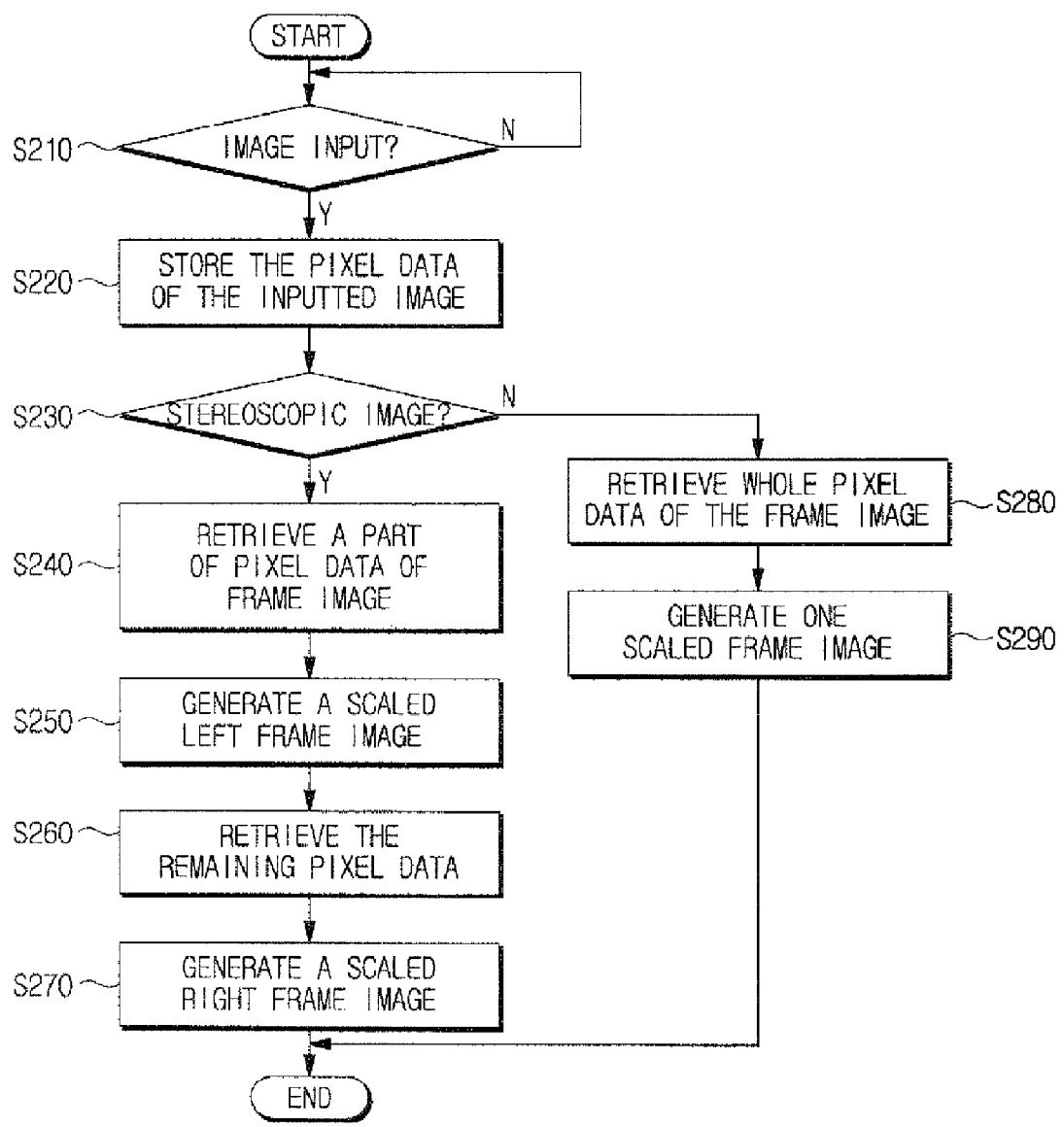
FIG. 2 is a flow chart to explain a method of scaling by the image dimension according to an exemplary embodiment of the present invention.

Hereinbelow, a process of operating a scaler 120 of FIG. 1 will be explained in detail with reference to FIG. 2. FIG. 2 is a flowchart to explain a method of scaling by the image dimension of the inputted image according to an exemplary embodiment of the present invention.

If an image is inputted (S210-Y), the line buffer 122 and the storage unit 124 store the pixel data of the inputted image (S220). That is, the line buffer 122 stores the pixel data of the inputted image in a line unit, and transmits the stored pixel data to the storage unit 124. The storage unit 124 stores the pixel data of a line unit transmitted from the line buffer 122 in a frame unit.

The image analysis unit 110 determines whether the inputted image is a stereoscopic image or not (S230). That is, if the inputted image is a combination of a left frame image and a right frame image, the image analysis unit 110 determines that the inputted image is a stereoscopic image, but if the inputted image includes only one frame image, the image analysis unit 110 determines that the inputted image is a plane image.

If the inputted image is the stereoscopic image (S230-Y), the controller 126 retrieves a part of pixel data of the inputted image stored at the storage unit 124 and transmits the retrieved pixel data to the scaling filter 128 (S240). The retrieved pixel data may constitute the left frame image of the stereoscopic image.

The scaling filter 128 generates a left frame image by using the pixel data transmitted from the controller 126 (S250). More particularly, the scaling filter 128 scales the pixel data transmitted from the controller 126 to a suitable size for a screen on which the transmitted pixel data is to be displayed, when generating the left frame image.

The controller 126 retrieves the remaining pixel data among the pixel data of the same inputted image at the storage unit 124 and transmits the retrieved pixel data to the scaling filter 128 (S260).

The scaling filter 128 scales the right frame image by using the remaining pixel data to a suitable size for a screen on which the transmitted remaining pixel data is to be displayed (S270).

If the left frame image and the right frame image are inputted, the scaler 120 stores the stereoscopic image in a frame unit, and retrieves a part of pixel data stored at storage unit 124 to generate the left frame image and the right frame image so that a separate apparatus to divide the stereoscopic image is unnecessary.

The processes of dividing and scaling the inputted frame image are both performed in the scaler 120 at once such that data loss is minimized. As a result, deterioration of an image quality may be prevented. Also, both processes of dividing and scaling the stereoscopic image are performed at once such that a data processing time may be reduced.

Meanwhile, if the inputted image is not the stereoscopic image (S230-N), the controller 126 retrieves the whole pixel data of the inputted image stored at the storage unit 124 and transmits the retrieved pixel data to the scaling filter 128 (S280).

The scaling filter 128 generates one frame image by scaling the transmitted pixel data (S290).

Hereinbelow, a method for retrieving the pixel data of the stereoscopic image stored at the storage unit 124 by the controller 128 will be explained in detail. For a convenient explanation, a method for storing the pixel data of the stereoscopic image by the storage unit 124, and a method for retrieving the pixel data of the stereoscopic image by the controller 126 will be explained.

Figures 3A, 3B:
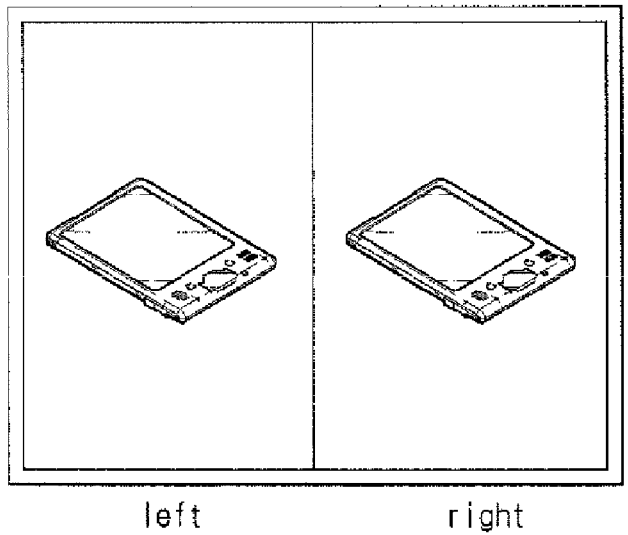

FIG. 3A through FIG. 3C are drawings to explain methods for storing and retrieving the pixel data of the stereoscopic image of one frame, according to an exemplary embodiment of the present invention.

FIG. 3A is a drawing illustrating the stereoscopic image which is a combination of a left frame image and a right frame image into one frame image. The left frame image among the frame images of FIG. 3A is the image photographed through the left lens of the binocular lens of the stereography camera used to capture the image, and the right frame image is the image photographed through the right lens of the binocular lens.

FIG. 3B lists the pixel data of the image of FIG. 3A. If the stereoscopic image is in m×n structure, pixel data of m×n/2 pixels on the left side of the m×n structure is the pixel data of the left frame image, and pixel data of m×n/2 pixels on the right side of the m×n structure is the pixel data of the right frame image.

FIG. 3C is a drawing illustrating order of the pixel data stored at the storage unit 124 and an order of retrieving the pixel data from the storage unit 124. The left side of a table of FIG. 3C lists addresses of the storage unit 124 in which the pixel data is stored, the center lists the pixel data stored at the storage unit 124, and the right side list an order of retrieving the pixel data stored at the storage unit 124.

The storage unit 124 sequentially stores the pixel data from a left-upper side to a right-bottom side such that 'L1, 1' of first pixel data of the upper-left side is stored at address 1 of the storage unit 124. 'L1, 2' of pixel data following the 'L1, 1' is stored at address 2 following the address 1.

Referring to FIG. 3C, if the inputted image is the stereoscopic image, the pixel data of the left side frame image and the pixel data of the right frame image are mixedly stored, when listed in the address order of the storage unit 124. The controller 126 groups the pixel data of the stereoscopic image and retrieves the pixel data groups in alternate order instead of retrieving the pixel data of the left frame image in storing order. In case of retrieving the grouped pixel data, the controller 126 may retrieve in the grouped pixel data in sequential address order of the pixel data stored at the storage unit 124.

The controller 126 groups pixel data at addresses from 1 to n/2 of the storage unit 124 into pixel data group 1, and groups pixel data at addresses from n/2+1 to n of the storage unit 124 into pixel data group 2. The pixel data of the stereoscopic image is grouped into 2$m$ pixel data groups. When retrieving the left frame image of a stereoscopic image, the controller 126 retrieves pixel data group 1, pixel data group 3, . . . , and pixel data group 2$m$−1, and transmits the retrieved pixel data to the scaling filter 128.

The scaling filter 128 scales the retrieved pixel data such that a left frame image to be displayed is generated.

When retrieving the right frame image of a stereoscopic image, the controller 126 retrieves pixel data group 2, pixel data group 4, . . . , pixel data group 2$m$ from the same inputted image, and transmits the retrieved pixel data to the scaling filter 128. Accordingly, the scaling filter 128 scales the retrieved pixel data to generate a right frame image to be displayed.

The pixel data of the whole stereoscopic image is stored at the storage unit 124. The controller retrieves a part of the pixel data, and transmits the retrieved pixel data to the scaling filter 128. The scaling filter 128 generates one frame image by using the part of the pixel data such that an apparatus for dividing the stereoscopic image is unnecessary.

Figures 4A, 4B:
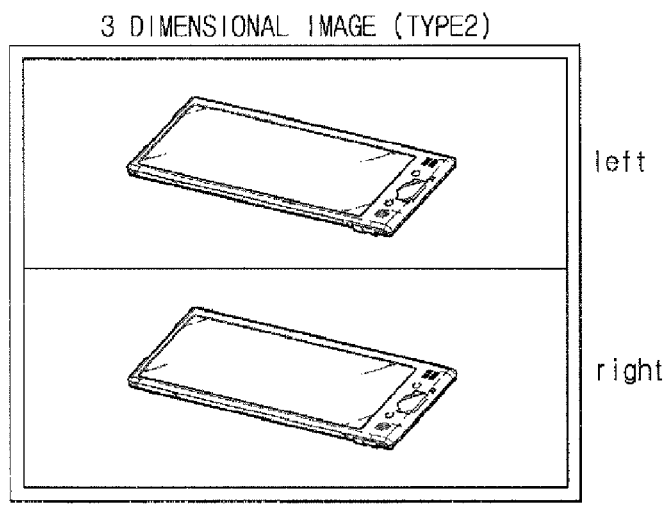

FIG. 4A through FIG. 4C are drawings illustrating methods for storing and retrieving a stereoscopic image according to another embodiment of the present invention.

FIG. 4A is a drawing illustrating a stereoscopic image in which the left frame image and the right frame image are combined vertically with each other into one frame image. FIG. 4B illustrates the pixel data of the stereoscopic image illustrated in FIG. 4A.

The storage unit 124 stores the pixel data of the frame image from left-upper side to right-bottom side in order. Accordingly, the pixel data of the left frame image is stored at the storage unit 124, and then the pixel data of the right frame image is stored in order as illustrated in FIG. 4C.

More particularly, in address order of the storage unit 124, the pixel data of the left frame image is stored at addresses from 1 to (m×n)/2, and the pixel data of the right frame image is stored at addresses from (m×n)/2+1 to m×n.

The controller 126 groups the pixel data stored at addresses from 1 to (m×n)/2 into pixel data group 1, and groups the pixel data stored at addresses from (m×n)/2+1 to (m×n) into pixel data group 2.

To retrieve the pixel data from the storage unit 124, the controller 126 retrieves the pixel data group 1 in address order to generate the left frame image, and transmits the retrieved pixel data to the scaling filter 128, and then retrieves the pixel data group 2 in address order to generate the right frame image, and transmits the retrieved pixel data to the scaling filter 128.

In FIGS. 3 and 4, the pixel data group adjacent to the retrieved pixel data group is not retrieved when the controller 126 groups the pixel data and retrieves the first set of grouped pixel data to generate one frame image. By doing so, the grouped pixel data are retrieved in an alternating order.

In the above example, irrespective of whether the pixel data represent the left frame image or the right frame image, the pixel data are stored sequentially, in address order of the storage unit 124 from the left-upper side to the right-bottom side of frame image. However, the foregoing exemplary embodiment is not to be construed as limiting the present invention. The storage unit 124 may classifiably store the pixel data of the left frame image and the pixel data of the right frame image in respectively designated areas. In this case, the controller 126 may retrieve the pixel data stored from a specific address of the storage unit 124 and transmit the retrieved pixel data to the scaling filter 128.

Although an exemplary embodiment of the present invention explains that the image analysis unit 110 analyzes a dimension of an image to be inputted, the controller 126 may determine the dimension of an image to be inputted and control the storage unit 124.

The exemplary embodiment of the present invention explains that the right frame image is scaled after the left frame image is scaled, but it is not limited. The controller 126 may retrieve the pixel data of the left frame image, after retrieving the pixel data of the right frame image and transmitting the retrieved pixel data to the scaling filter 128.

Hereinbelow, another exemplary embodiment of the present invention will be explained with reference to FIGS. 5 and 6.

Figure 5:
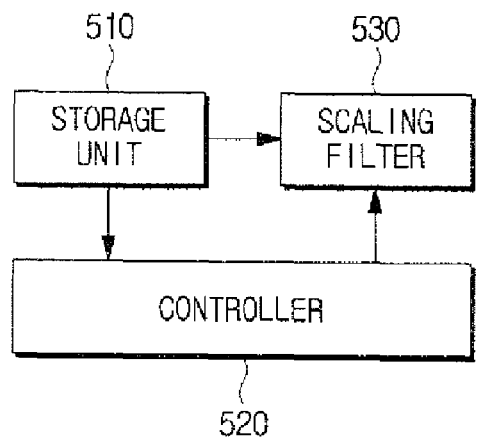
FIG. 5 is a block diagram of the image signal process apparatus according to another exemplary embodiment of the present invention.

As illustrated in FIG. 5, the image signal process apparatus in accordance with another embodiment of the present invention may comprise a storage unit 510, a controller 520, and a scaling filter 530. The storage unit 510 stores pixel data of an inputted frame image, the scaling filter 530 generates one frame image by scaling pixel data, and the controller 520 retrieves the part of the pixel data among the pixel data of the inputted frame image stored at the storage unit 510, and transmits the retrieved pixel data to the scaling filter 530.

Figure 6:
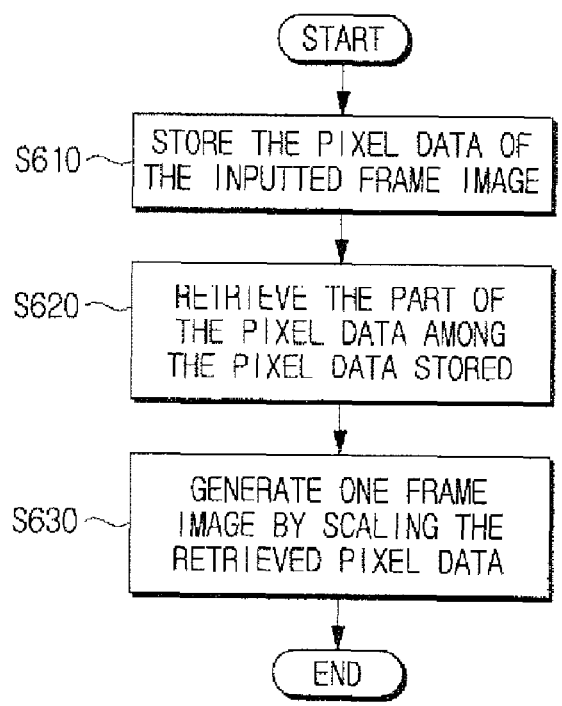
FIG. 6 is a flowchart to explain a process of scaling the stereoscopic image in the image signal process apparatus illustrated of FIG. 5.

According to a method for scaling the stereoscopic image illustrated in FIG. 6, the storage unit 510 stores the pixel data of the inputted frame image (S610), the controller 520 retrieves the part of the pixel data among the pixel data of the frame image stored at the storage unit 510 and transmits the retrieved pixel data to the scaling filter 530 (S620), and the scaling filter 530 generates one frame image by scaling the retrieved pixel data (S630).

Accordingly, the exemplary embodiments of the present invention may display the stereoscopic image by scaling without requiring a separate apparatus, and deterioration of an image quality of a displayed image may be prevented. Also, the time to process the stereoscopic image may be reduced.

As described above, the stereoscopic image is displayed by scaling without having to use the formatter.

A process of processing a signal by using a separate formatter is unnecessary to display the stereoscopic image which minimizes the data loss. As a result, deterioration of an image quality may be prevented, and a data processing time may be reduced.

Further, the foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image signal process apparatus comprising:
    a storage unit which stores pixel data of an input frame image; and
    a controller which, when the input frame image is a stereoscopic image which is a combination of a left frame image and a right frame image, retrieves a portion of the pixel data of the input frame image stored at the storage unit and transmits the retrieved portion of the pixel data to a scaling unit;
    wherein the scaling unit generates one frame image by scaling the portion of pixel data of the input frame image when the input frame image is the stereoscopic image and generates one frame image by scaling whole pixel data of the input frame image when the input frame image is not the stereoscopic image; and
    wherein the portion of pixel data retrieved by the controller constitutes one of the left frame image and the right frame image.

2. The image signal process apparatus of claim 1, wherein the controller retrieves the remaining pixel data among pixel data of the frame image stored at the storage unit and transmits the retrieved remaining pixel data to the scaling unit, and the scaling unit generates another frame image by scaling the remaining pixel data.

3. The image signal process apparatus of claim 1, wherein the portion of the pixel data retrieved by the controller comprises the pixel data of the left frame image, and
    wherein the controller retrieves the pixel data of the right frame image, after retrieving the pixel data of the left frame image, and transmits the retrieved pixel data of the right frame image to the scaling unit.

4. The image signal process apparatus of claim 1, wherein the controller groups the pixel data stored at the storage unit, and retrieves the grouped pixel data in an alternate order.

5. The image signal process apparatus of claim 1, wherein if the input frame image is not a stereoscopic image, the controller retrieves all of the pixel data of the frame image stored at the storage unit, and transmits all of the pixel data to the scaling unit.

6. The image signal process apparatus of claim 1, further comprising an image analysis unit that determines whether the input frame image is a stereoscopic frame image, and transmits a determination result to the controller.

7. The image signal process apparatus of claim 1, wherein, if the input frame image is a stereoscopic frame image comprising a left image and a right image, the storage unit stores rows of the left image and rows of the right image in an alternating manner.

8. The image signal process apparatus of claim 7, wherein the controller groups pixel data of each row of the left image into odd-numbered groups, groups pixel data of each row of the right image into even-numbered groups, and alternatingly retrieves grouped pixel data from the odd-numbered groups and even-numbered groups.

9. The image signal process apparatus of claim 1, wherein, if the input frame image is a stereoscopic frame image comprising a left image and a right image, the storage unit stores all rows of one of the left image and right image, followed by all rows of the other one of the left image and right image.

10. A method for controlling an image signal process apparatus having a processor, the method comprising:
    storing pixel data of an input frame image;
    retrieving, by the processor, a portion of the stored pixel data of the input frame image, when the input frame image is a stereoscopic image which is a combination of a left frame image and a right frame image; and
    generating one frame image by scaling the retrieved portion of the pixel data of the input frame image when the input frame image is the stereoscopic image and generating one frame image by scaling whole pixel data of the input frame image when the input frame image is not the stereoscopic image; and
    wherein the retrieved portion of the stored pixel data constitutes one of the left frame image and the right frame image.

11. The method of claim 10, wherein the retrieving comprises retrieving the remaining pixel data among the stored pixel data of the frame image, and the generating the frame comprises generating another frame image by scaling the retrieved remaining pixel data.

12. The method of claim 10, wherein the retrieved portion of the stored pixel data comprises the left frame image,
    wherein the retrieving comprises retrieving the pixel data of the right frame image, after retrieving the pixel data of the left frame image, and
    wherein the generating the frame comprises generating a frame by scaling the retrieved left frame image and generating another frame by scaling the retrieved right frame image.

13. The method of claim 10, wherein the retrieving comprises grouping the pixel data, and retrieving the grouped pixel data in an alternate order.

14. The method of claim 10, wherein if the input frame image is not a stereoscopic image, retrieving all of the pixel data of the frame image stored at the storage unit, and generating the one frame image based on all of the pixel data of the frame image.

15. The method of claim 10, further comprising determining whether the input frame image is a stereoscopic frame image,
    wherein, the retrieving comprises retrieving at least a portion of the stored pixel data of the frame image based on a result of the determining.

16. The method of claim 10, wherein, if the input frame image is a stereoscopic frame image comprising a left image and a right image, the storing comprises storing rows of the left image and rows of the right image in an alternating manner.

* * * * *